US012785571B2

(12) United States Patent
Yang et al.

(10) Patent No.: US 12,785,571 B2
(45) Date of Patent: Nov. 3, 2026

(54) CONTROL CIRCUIT FOR OPERATION OF ISOLATED SWITCHING-MODE CONVERTER IN SLEEP MODE

(71) Applicant: SHANGHAI BRIGHT POWER SEMICONDUCTOR CO., LTD., Shanghai (CN)

(72) Inventors: Pengbo Yang, Shanghai (CN); Zhen Zhu, Shanghai (CN); Jia Wang, Shanghai (CN); Yue Zheng, Shanghai (CN); Jianpei Zhu, Shanghai (CN); Yucai Yang, Shanghai (CN); Yuehui Li, Shanghai (CN)

(73) Assignee: Shanghai Bright Power Semiconductor Co., Ltd., Shanghai (CN)

( * ) Notice: Subject to any disclaimer, the term of this patent is extended or adjusted under 35 U.S.C. 154(b) by 192 days.

(21) Appl. No.: 18/671,277

(22) Filed: May 22, 2024

(65) Prior Publication Data

US 2024/0396458 A1 Nov. 28, 2024

(30) Foreign Application Priority Data

May 22, 2023 (CN) ........................ 202310581657.0

(51) Int. Cl.
*H02M 3/335* (2006.01)
*H02M 1/00* (2006.01)

(52) U.S. Cl.
CPC ..... *H02M 3/33523* (2013.01); *H02M 1/0032* (2021.05)

(58) Field of Classification Search
CPC ........................ H02M 1/0032; H02M 3/33523
See application file for complete search history.

(56) References Cited

U.S. PATENT DOCUMENTS

| | | | | |
|---|---|---|---|---|
| 5,949,660 | A * | 9/1999 | Rehm | H02J 1/102 363/16 |
| 2008/0298095 | A1* | 12/2008 | Chuang | H02M 3/33523 363/21.12 |
| 2018/0323722 | A1* | 11/2018 | Chen | H02M 3/33523 |
| 2019/0319480 | A1* | 10/2019 | Cui | H02J 9/065 |
| 2020/0169179 | A1* | 5/2020 | Hara | H02M 1/38 |
| 2020/0412231 | A1* | 12/2020 | Khamesra | H02M 3/33523 |

* cited by examiner

*Primary Examiner* — Harry R Behm
(74) *Attorney, Agent, or Firm* — Muncy, Geissler, Olds & Lowe, P.C.

(57) ABSTRACT

A control circuit and method for an isolated switching-mode converter are disclosed. The control circuit includes a primary-side controller and a secondary-side controller. The primary-side controller can enter a sleep mode in response to a first request signal, and the primary-side controller can turn on or off a first switch in the primary-side circuit in a predefined manner to cause a secondary-side winding in a transformer to generate a predefined first output signal. The secondary-side controller can detect the first output signal and responsively enter the sleep mode. In this way, both the primary-side and secondary-side controllers can enter the sleep mode, thus significantly reducing standby power dissipation of the system.

17 Claims, 3 Drawing Sheets

CONTROL CIRCUIT FOR OPERATION OF ISOLATED SWITCHING-MODE CONVERTER IN SLEEP MODE

CROSS-REFERENCES TO RELATED APPLICATION

This application claims the priority of Chinese patent application number 202310581657.0, filed on May 22, 2023, the entire contents of which are incorporated herein by reference.

TECHNICAL FIELD

The present invention relates to the field of electronic circuits and, in particular, to a control circuit and method for an isolated switching-mode converter.

BACKGROUND

With the rapid development of large-scale and very-large-scale integrated circuits, isolated switching-mode converters which are small and efficient have been widely used in various power supply systems. An isolated switching-mode converter usually includes a primary-side circuit and a secondary-side circuit, and a stable output of the secondary-side circuit can be obtained by controlling turn-on and turn-off of a power switch in the primary-side circuit.

Conventional isolated switching-mode converters commonly include a separate opto-isolator (also known as an optocoupler) which serves to transfer signals between the primary and secondary sides and to prevent cross-conduction of the primary-side and secondary-side circuits by interlocking the power switch transistor in the primary-side circuit with a synchronous rectifier transistor in the secondary-side circuit. This is advantageous in terms of circuit simplification and optimized system efficiency. However, since the opto-isolator and associated circuitry consume much power even in a standby state, still further improvement would be desirable to reduce standby power dissipation of such a system.

SUMMARY

It is an objective of the present invention to provide a control circuit for an isolated switching-mode converter, which overcomes the problem of considerable standby power dissipation associated with the conventional isolated switching-mode converters.

To this end, the present invention provides a control circuit for controlling an isolated switching-mode converter including a primary-side circuit, a secondary-side circuit and a transformer coupled between the primary-side circuit and the secondary-side circuit. The control circuit includes: a primary-side controller electrically connected to the primary-side circuit, the primary-side controller configured to generate, when receiving a first request signal indicative of a request to enter a sleep mode, a predefined first control signal for turning on or off a first switch in the primary-side circuit in a predefined manner and thereby causing the primary-side controller to enter the sleep mode; and a secondary-side controller electrically connected to the secondary-side circuit, the secondary-side controller configured to acquire an output signal of a secondary-side winding in the transformer and to enter the sleep mode when the output signal is a predefined first output signal, the first output signal responding to the first control signal.

Optionally, the primary-side controller may include a first receiver circuit, a first logic processing circuit and a first driver circuit, the first receiver circuit configured to receive the first request signal and provide it to the first logic processing circuit, the first logic processing circuit configured to generate a drive signal based on the first request signal and provide the drive signal to the first driver circuit, the first driver circuit configured to generate the first control signal based on the drive signal.

Optionally, the primary-side controller may be also configured to detect a power supply voltage and enter, when the power supply voltage drops below a first threshold voltage, a partial wake-up mode in which the first switch is turned on at least once to increase the power supply voltage to a level not lower than the first threshold voltage.

Optionally, the primary-side controller may be partially woken up at a predetermined switching frequency, in which the first switch is turned on at least once to increase the power supply voltage of the primary-side controller.

Optionally, the primary-side controller may be partially woken up to increase the power supply voltage and again enters the sleep mode when the power supply voltage reaches a second threshold voltage.

Optionally, the isolated switching-mode converter may further include an auxiliary winding and a power supply capacitor, the auxiliary winding coupled to the transformer, the auxiliary winding and the power supply capacitor each connected at one end to a ground terminal for the primary-side circuit, the other end of the power supply capacitor coupled to the other end of the auxiliary winding through a diode. Additionally, the primary-side controller may include an undervoltage lockout circuit, a first logic processing circuit and a first driver circuit, the undervoltage lockout circuit electrically connected to the other end of the power supply capacitor and configured to acquire a voltage across the power supply capacitor as the power supply voltage, the first logic processing circuit configured to generate, when the power supply voltage drops below the first threshold voltage, a drive signal based on an associated comparison and provide the drive signal to the first driver circuit, the first driver circuit configured to generate, based on the drive signal, an ON signal for turning on the first switch to allow the power supply capacitor to be charged to increase the power supply voltage to a level not lower than the first threshold voltage.

Optionally, the control circuit may further include: a protocol chip coupled to the secondary-side controller, the protocol chip configured to provide the secondary-side controller with a first instruction signal which instructs entering the sleep mode; and an isolator coupled between the primary-side controller and the secondary-side controller, wherein the secondary-side controller receives the first instruction signal, utilizes the isolator to produce the first request signal and provides the first request signal to the primary-side controller.

Optionally, the secondary-side controller may be also configured to maintain a second switch in the secondary-side circuit in an off state based on the first instruction signal, thereby operating the secondary-side circuit in an asynchronous rectification mode.

Optionally, the secondary-side controller may include a second receiver circuit, a second logic processing circuit and a second driver circuit, the second receiver circuit configured to receive the first instruction signal and provide it to the second logic processing circuit, the second logic processing circuit configured to generate a drive signal based on the first instruction signal and provide the drive signal to the second driver circuit, the second driver circuit configured to generate, based on drive signal, an OFF signal for maintaining the second switch in the off state.

Optionally, the isolator may be a magnetic isolator, a capacitive isolator or a digital isolator.

Optionally, the secondary-side controller may include a detection circuit and a second logic processing circuit, the detection circuit configured to acquire the output signal of the secondary-side winding and provide it to the second logic processing circuit, the second logic processing circuit configured to instruct the secondary-side controller to enter the sleep mode when the output signal is the predefined first output signal.

Optionally, the control circuit may further include a protocol chip, which is coupled to the secondary-side controller and configured to provide the secondary-side controller with a second instruction signal which instructs exiting the sleep mode.

Optionally, the secondary-side controller may be configured to acquire the output signal of the secondary-side winding in the transformer and to exit the sleep mode when the output signal is a predefined second output signal and when it has received the second instruction signal, wherein the control circuit further includes an isolator coupled between the primary-side controller and the secondary-side controller; the secondary-side controller is configured to receive the second instruction signal, utilize the isolator to produce a second request signal and provide the second request signal to the primary-side controller; and the primary-side controller is also configured to exit the sleep mode when receiving the second request signal.

Optionally, the primary-side controller may be also configured to receive a power supply voltage and enter, when the power supply voltage drops below a first threshold voltage, a partial wake-up mode in which the first switch is turned on to increase the power supply voltage to a level not lower than the first threshold voltage, wherein the primary-side controller is woken up when it receives the second request signal while being partially awakened and thus completely exits the sleep mode.

Optionally, the secondary-side controller may be also configured to receive the second instruction signal that instructs exiting the sleep mode and to turn on a second switch in the secondary-side circuit based on the second instruction signal, wherein the primary-side controller exits the sleep mode when sensing a change in a signal from the secondary-side winding in the transformer.

Optionally, the primary-side controller may be also configured to generate, after exiting the sleep mode, a second control signal for turning on or off the first switch in the predefined manner, wherein the secondary-side controller is configured to acquire the output signal of the secondary-side winding in the transformer and exit the sleep mode when the output signal is a predefined third output signal, the third output signal responding to the second control signal.

Optionally, the primary-side controller is also configured to enter a partial wake-up mode at a predetermined switching frequency, in which the first switch is turned on at least once to increase a power supply voltage of the primary-side controller.

Optionally, the isolated switching-mode converter further comprises an auxiliary winding and a power supply capacitor, the auxiliary winding coupled to the transformer, one end of the auxiliary winding and one end of the power supply capacitor both connected to a ground terminal for the primary-side circuit, the other end of the power supply capacitor coupled to the other end of the auxiliary winding through a diode, the power supply capacitor providing the power supply voltage to the primary-side controller.

The present invention also provides a control method for an isolated switching-mode converter. The control method includes: providing a first request signal indicative of a request to enter a sleep mode to a primary-side controller, which then generates, based on the first request signal, a predefined first control signal for turning on or off a first switch in a primary-side circuit in a predefined manner and thereby causing the primary-side controller to enter the sleep mode; turning on or off the first switch based on the predefined first control signal to cause a voltage change in a secondary-side winding in a transformer, thereby producing a predefined first output signal; and entry of the secondary-side controller into the sleep mode when it detects the predefined first output signal.

Optionally, after entering the sleep mode, the primary-side controller may further detect a power supply voltage and enter, when the power supply voltage drops below a first threshold voltage, a partial wake-up mode in which the first switch is turned on to increase the power supply voltage to a level not lower than the first threshold voltage.

Optionally, the primary-side controller may be partially woken up to increase the power supply voltage and enter the sleep mode again when the power supply voltage reaches a second threshold voltage.

Optionally, a protocol chip may provide the secondary-side controller with a first instruction signal which instructs entering the sleep mode, wherein the secondary-side controller generates, based on the first instruction signal indicating entering the sleep mode, utilizes an isolator to produce the first request signal and provides the first request signal to the primary-side controller.

Optionally, the secondary-side controller may maintain, based on the first instruction signal, a second switch in the secondary-side circuit in an off state, thereby operating the secondary-side circuit into an asynchronous rectification mode.

Optionally, the control method may further include: providing a second instruction signal which instructs exiting the sleep mode by a protocol chip to the secondary-side controller and detecting, by the secondary-side controller, that an output signal of the secondary-side winding in the transformer is a predefined second output signal, followed by responsive exit of the secondary-side controller from the sleep mode; and by the secondary-side controller, generating a signal indicating exiting the sleep mode based on the second instruction signal and transmitting a second request signal through an isolator to the primary-side controller, which causes the primary-side controller to exit the sleep mode.

Optionally, after entering the sleep mode, the primary-side controller may further receive a power supply voltage and enter, when the power supply voltage drops below a first threshold voltage, a partial wake-up mode in which the first switch is turned on to increase the power supply voltage to a level not lower than the first threshold voltage, wherein the primary-side controller completely exits the sleep mode when receiving the second request signal while being partially awakened.

Optionally, the control method may further include: providing a second instruction signal which instructs exiting the sleep mode by a protocol chip to the secondary-side controller; turning on a second switch in the secondary-side circuit by the secondary-side controller based on the second instruction signal, thereby causing a change in a signal from the secondary-side winding in the transformer; and exit of the primary-side controller from the sleep mode when it senses the change in the signal from the secondary-side winding in the transformer.

Optionally, after exiting the sleep mode, the primary-side controller may generate a second control signal for turning on or off the first switch in the predefined manner, wherein the first switch is turned on or off based on the second control signal to cause a voltage change in the secondary-side winding in the transformer, thereby producing a predefined third output signal; the secondary-side controller acquires an output signal of the secondary-side winding in the transformer and exits the sleep mode when the output signal is the predefined third output signal; and the third output signal responds to the second control signal.

In the control circuit of the present invention, the primary-side controller can enter a sleep mode, when so requested, and can turn on or off the first switch in the primary-side circuit in a predefined manner to cause the secondary-side winding of the transformer to generate a predefined first output signal. The secondary-side controller can detect the predefined first output signal and determine, based on the detected signal, that the primary-side controller has entered the sleep mode in response to the first request signal. Responsively, the secondary-side controller also enters the sleep mode. In this sleep mode, most modules in the primary-side and secondary-side controllers, as well as the isolator, are powered off. In this way, not only the primary-side and secondary-side controllers can enter the sleep mode quickly, but the system's standby power dissipation can also be significantly reduced.

Further, in practical applications of the control circuit of the present invention, a magnetic, capacitive, digital or similar isolator may be used as the isolator arranged between the primary-side and secondary-side controllers. As the isolator almost does not consume power at all when in the sleep mode, overall standby power dissipation of the entire system in the sleep mode can be further reduced.

DETAILED DESCRIPTION

Control circuits and methods for an isolated switching-mode converter according to the present invention will be described in greater detail below with reference to the accompanying drawing, which illustrate specific embodiment thereof. From the following description, advantages and features of the invention will become apparent. Note that the figures are provided in a very simplified form not necessarily drawn to exact scale for the only purpose of helping to explain the disclosed embodiments in a more convenient and clearer way. As used herein, the terms "time", "on-time" and "on-time period" each refer to a period of time, and the term "instant", "when" and "turn-off time" each refer to a point of time at which an event occurs. As used herein, the terms "valid level" and "high level" each refer to an electrical level indicative of an action to be taken by a designated element or module, which is detectable and determined to be valid, and the terms "invalid level" and "low level" each refer to an electrical level indicative of an action to be taken by a designated element or module, which is detectable but determined to be invalid, or is undetectable. The term "signal" refers to an electrical signal/magnetic signal, which can be represented by a particular waveform, or to information transmitted in a circuit, which can be represented by a particular value.

Figure 1:
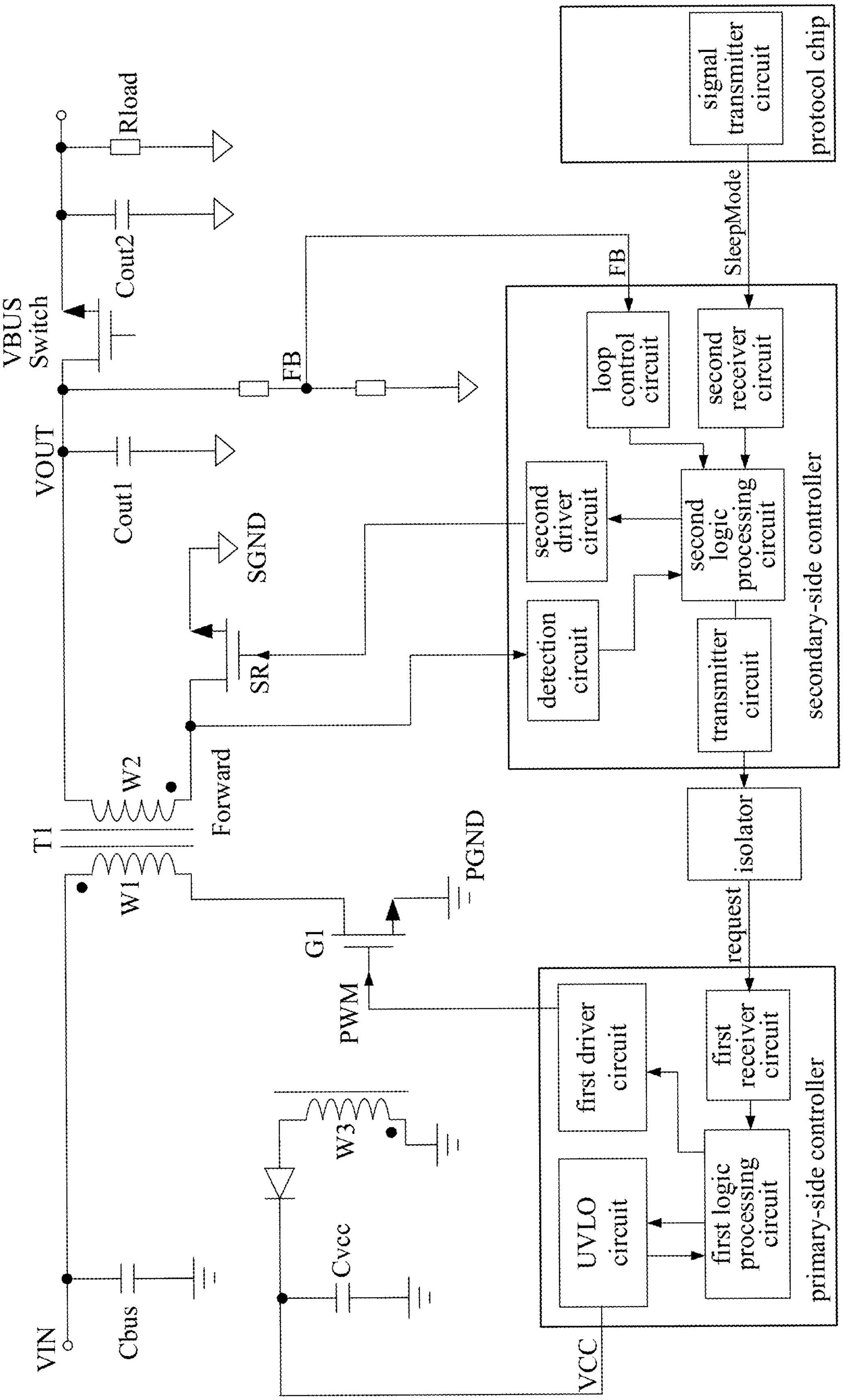
FIG. 1 is a schematic circuit diagram of an isolated switching-mode converter coupled to a control circuit according to an embodiment of the present invention.

FIG. 1 is a schematic circuit diagram of an isolated switching-mode converter coupled to a control circuit according to an embodiment of the present invention. The converter shown in FIG. 1 may be, for example, a flyback converter. The isolated switching-mode converter includes a primary-side circuit, a secondary-side circuit and a transformer T1 coupled between the primary-side and secondary-side circuits to provide electrical isolation. The electrically isolated primary-side and secondary-side circuits are connected to different ground terminals. The transformer T1 includes a primary-side winding W1 and a secondary-side winding W2. The primary-side circuit is coupled to the primary-side winding W1 of the transformer T1, and the secondary-side circuit is coupled to the secondary-side winding W2 of the transformer T1.

With continued reference to FIG. 1, the control circuit 10 includes a primary-side controller and a secondary-side controller. The primary-side controller is electrically connected to the primary-side circuit. In this embodiment, the primary-side controller is connected to at least a first switch G1 in the primary-side circuit and configured to generate a control signal PWM for the first switch G1, which turns on or off the first switch G1. The secondary-side controller is electrically connected to the secondary-side circuit. In this embodiment, the secondary-side controller is connected to a second switch SR in the secondary-side circuit and configured to generate a control signal for the second switch SR, which turns on or off the second switch SR. Additionally, in this embodiment, the secondary-side controller may also be coupled to the secondary-side winding W2 of the transformer T1 and configured to acquire an output signal Forward of the secondary-side winding W2 in the transformer T1. That is, in this embodiment, the secondary-side controller can sense the output signal Forward of the sense secondary-side winding W2. The output signal Forward reflects an operating condition of the primary-side circuit, and the control signal generated by the secondary-side controller, an operating condition of the secondary-side controller and/or the like may be adjusted based on a possible change in the sensed output signal Forward. For example, based on a change in the output signal Forward, the secondary-side controller may generate a control signal for the second switch SR, which synchronizes the second switch SR with the first switch G1 to avoid cross-conduction of the primary and secondary sides.

In one example, the primary-side circuit may include an input capacitor Cbus and the first switch G1. A first terminal of the input capacitor Cbus is coupled to the primary-side winding W1 of the transformer T1, and a second terminal of the input capacitor Cbus is connected to the ground terminal for the primary-side circuit. For example, the first switch G1 may be a power switch transistor. A drain of the power switch transistor is connected to the primary-side winding W1 of the transformer T1. A source of the power switch transistor is connected to the ground terminal for the primary-side circuit. A gate of the power switch transistor is connected to the primary-side controller, in order to receive the control signal PWM for the first switch G1.

In one example, the secondary-side circuit may include the second switch SR, an output capacitor Cout1 and a sampling circuit. A first terminal of the output capacitor Cout1 is coupled to the secondary-side winding W2 of the transformer T1, and the first terminal of the output capacitor Cout1 is also coupled to a load via a switch. A second terminal of the output capacitor Cout1 is connected to the ground terminal for the secondary-side circuit. For example, the second switch SR may be a power switch transistor. A drain of the power switch transistor is connected to the secondary-side winding W2 of the transformer T1. A source of the power switch transistor is connected to the ground terminal for the secondary-side circuit. A gate of the power switch transistor is connected to the secondary-side controller, in order to receive the control signal for the second switch SR. The sampling circuit is connected to an output terminal of the isolated switching-mode converter, in order to sample an output voltage of the converter as output feedback FB that directly or indirectly reflects a load condition at the output terminal. The sampling circuit may also be electrically connected to the secondary-side controller, in order to transmit the output feedback FB to the secondary-side controller. The secondary-side controller may modulate the control signal for the second switch SR based on the output feedback FB.

In other words, the primary-side controller in the control circuit 10 can be used to turn on or off the first switch G1, and the secondary-side controller in the control circuit 10 can be used to turn on or off the second switch SR. Notably, in this embodiment, when in a standby state, the control circuit 10 may enter a sleep mode to reduce standby power dissipation of various modules therein. The primary-side and secondary-side controllers may individually enter a sleep mode.

Specifically, the primary-side controller may be configured to receive a first request signal request_1 indicating a request to enter the sleep mode. In practical applications, the first request signal request_1 may be, for example, a request signal transmitted at a frequency exceeding a maximum possible transmit frequency under normal operating conditions, or a request signal transmitted using a designated coding scheme, or a request signal with a modified pulse width or voltage value. Upon receiving the first request signal request_1, the primary-side controller may be configured to generate a first control signal PWM_1 which turns on or off the first switch G1 in the primary-side circuit so that the primary-side controller enters the sleep mode. Based upon the first control signal PWM_1, a switching action may be performed on the first switch G1. For example, the first switch G1 may be turned on or off at a frequency higher than that used in normal operation. Consequently, a voltage change may be caused in the secondary-side winding W2 of the transformer T1, and the latter may responsively produce a predefined first output signal Forward_1. That is, the first output signal Forward_1 generated by the secondary-side winding W2 may respond to the first control signal PWM_1 for the first switch G1. The secondary-side controller may enter the sleep mode when the output signal Forward of the secondary-side winding W2 that it acquires becomes the predefined first output signal Forward_1. In other words, the secondary-side controller may change its operating mode in response to a change in the output signal Forward. For example, the secondary-side controller may enter or exit the sleep mode in response to a change in the output signal Forward.

The predefined first output signal Forward_1 differs from the output signal Forward that is output in normal operation. In one example, the predefined first output signal Forward_1 may be a section of the output signal Forward sensed over a predetermined period of time, in which the voltage of the output signal Forward exceeds a preset voltage. For example, the output signal Forward may be periodic and has a certain period in normal operation, and in the predefined first output signal Forward_1 for causing the controller to enter the sleep mode, the voltage may again rise to a peak value within a timer shorter than the period.

In a specific example, in a sleep state of the primary-side controller, at least some modules in the primary-side controller may be powered off to reduce power dissipation. Likewise, in a sleep state of the secondary-side controller, at least some modules in the secondary-side controller may be turned off to reduce power dissipation. In this way, overall standby power dissipation of the entire system can be significantly reduced.

With continued reference to FIG. 1, the primary-side controller may in particular include a first receiver circuit, a first logic processing circuit and a first driver circuit. The first receiver circuit may be coupled to the first logic processing circuit, and the latter may be coupled to the first driver circuit which may be in turn coupled to a control terminal of the first switch G1 (i.e., the gate of the first switch G1). In order to put the system into the sleep mode, the first receiver circuit may be configured to receive the first request signal request_1 and provide the first request signal request_1 to the first logic processing circuit. In response, the first logic processing circuit may instruct the primary-side controller to enter the sleep mode, in which most modules in the primary-side controller are turned off to reduce power dissipation. The first logic processing circuit may be also configured to produce a drive signal based on the first request signal request_1 and send the drive signal to the first driver circuit, which may then generate a first control signal PWM_1 based on the drive signal. Based on the first control signal PWM_1, a predefined switching action may be then performed on the first switch G1.

The secondary-side controller may in particular include a detection circuit and a second logic processing circuit. The detection circuit may be electrically connected to an output terminal of the secondary-side winding W2 in the transformer T1 and configured to acquire the output signal Forward of the secondary-side winding W2 and provide the acquired signal to the second logic processing circuit. The second logic processing circuit may be coupled to the detection circuit and configured to instruct the secondary-side controller to enter the sleep mode when the output signal Forward becomes a predefined first output signal Forward_1. In order to put the system into the sleep mode, the primary-side controller may enter the sleep mode in response to the first request signal request_1, and at the same time, a predefined switching action may be performed on the first switch G1 based on a first control signal PWM_1. Consequently, a voltage change may be caused in the secondary-side winding W2 of the transformer T1, and the latter may responsively produce a predefined first output signal Forward_1. When sensing the first output signal Forward_1, the detection circuit in the secondary-side controller may provide it to the second logic processing circuit. In response, the second logic processing circuit may instruct the secondary-side controller to enter the sleep mode, in which most modules in the secondary-side controller are turned off to reduce power dissipation.

The secondary-side controller may be further configured to receive a first instruction signal SleepMode for initiating the sleep mode and provide, based on the first instruction signal, the primary-side controller with the first request signal request_1, which instructs the primary-side controller to enter the sleep mode. Moreover, the secondary-side controller may be optionally further configured to maintain the second switch SR in the secondary-side circuit in an off state, thereby putting the secondary-side circuit into an asynchronous rectification mode. To this end, the secondary-side controller may further include a second receiver circuit, a second driver circuit and a transmitter circuit. The second receiver circuit may be coupled to the second logic processing circuit and configured to receive the first instruction signal for initiating the sleep mode and provide the first instruction signal to the second logic processing circuit. The second driver circuit may be coupled to the second logic processing circuit, and the second logic processing circuit may produce a drive signal based on the first instruction signal and provide the drive signal to the second driver circuit. The second driver circuit may produce a turn-off signal for the second switch SR based on the drive signal, which maintains the second switch SR in an off state in the sleep mode. Additionally, the second logic processing circuit may be further configured to generate the first request signal request_1 based on the first instruction signal and transmit the first request signal request_1 to the primary-side controller through the transmitter circuit.

In an optional embodiment, when receiving the first instruction signal SleepMode for initiating the sleep mode, the secondary-side controller may additionally determine, based on output feedback FB (which reflects an output voltage VOUT of the isolated switching-mode converter), whether to put the system into the sleep mode. Specifically, after receiving the first instruction signal, the secondary-side controller may carry out actions necessary for entry into the sleep mode if a detected voltage of the output feedback FB is lower than a preset voltage (e.g., 5-7 V). Of course, in an alternative embodiment, once receiving the first instruction signal for initiating the sleep mode, the secondary-side controller may directly perform actions necessary for entry into the sleep mode, without making a determination based on the output feedback FB.

In a specific example, the control circuit 10 may further include a protocol chip and an isolator. The protocol chip may be coupled to the secondary-side controller, in order to provide the first instruction signal SleepMode for initiating the sleep mode to the secondary-side controller. In one example, the protocol chip may be coupled to the second receiver circuit in the secondary-side controller to provide the first instruction signal SleepMode to the second receiver circuit. The isolator may be coupled between the primary-side and secondary-side controllers to isolate the primary-side controller from the secondary-side controller. Signals from the secondary-side controller may be communicated to the primary-side controller through the isolator. For example, the secondary-side controller may receive the first instruction signal SleepMode, and the isolator may responsively produce the first request signal request_1 and couple it to the primary-side controller. The isolator may be, for example, a magnetic isolator, a capacitive isolator, a digital isolator or the like.

In one example, before entering the sleep mode, the primary-side controller may be also configured to detect its power supply voltage VCC. If the power supply voltage VCC is lower than a first threshold voltage VCCth1, a partial wake-up mode may be initiated to allow the first switch G1 to be turned on at least once to increase the power supply voltage VCC to a level not lower than the first threshold voltage VCCth1. After that, the primary-side controller may enter the sleep mode. Optionally, in the partial wake-up mode, only a driver module for controlling the first switch G1, as well as a small number of associated logic circuits, may be turned on to keep the power consumption of the primary-side controller at a very low level.

To this end, referring to FIG. 1, the isolated switching-mode converter may further include an auxiliary winding W3 and a power supply capacitor Cvcc. The auxiliary winding W3 may be coupled to the transformer T1. One end of the auxiliary winding W3 and one end of the power supply capacitor Cvcc may be both connected to the ground terminal for the primary-side circuit. The other end of the power supply capacitor Cvcc may be coupled to the other end of the auxiliary winding W3 via a diode. Specifically, a cathode of the diode may be connected to the power supply capacitor Cvcc, and an anode of the diode may be connected to the auxiliary winding W2. In practical applications, the power supply capacitor Cvcc may be charged via the auxiliary winding W3 to ensure that the power supply voltage VCC is provided to the primary-side controller at a sufficient level. Moreover, since the auxiliary winding W3 is coupled to the transformer T1, an output voltage of the auxiliary winding W3 (i.e., the power supply voltage VCC provided by the power supply capacitor Cvcc) is correlated with the output voltage VOUT of the secondary-side circuit. As such, as long as the power supply voltage VCC is kept within an adequate range, it can be ensured that the output voltage VOUT will not drop too low to meet the requirements of practical applications. Further, the protocol chip and the secondary-side controller can be provided with sufficiently high power supply voltages, which can avoid spurious triggering of shutdown.

In addition, the primary-side controller may further include an undervoltage lockout circuit, a first terminal of the undervoltage lockout circuit is electrically connected to the power supply capacitor Cvcc to allow detection of the power supply voltage VCC. A second terminal of the undervoltage lockout circuit is further coupled to the first logic processing circuit. When the power supply voltage VCC drops below the first threshold voltage VCCth1, the first logic processing circuit may generate a drive signal based on an associated comparison and provide the drive signal to the first driver circuit, which may then produce, based on the drive signal, a signal for turning on the first switch G1. As a result of the first switch G1 being turned on, the power supply capacitor Cvcc can be charged, increasing the power supply voltage VCC to a level not lower than the first threshold voltage VCCth1. In this way, the power supply voltage VCC can be kept high enough and avoid the output voltage VOUT at an output terminal of the secondary-side circuit from dropping too low.

In an alternative example, before entering the sleep mode, the primary-side controller may be put into the partial wake-up mode in a predefined manner. For example, the first switch G1 may be turned on at a predetermined switching frequency to allow the power supply capacitor Cvcc to be charged. The predetermined switching frequency may be chosen as a value lower than a switching frequency used in normal operation. In this way, the power supply voltage VCC can be kept sufficiently high with low power consumption and thereby avoid the output voltage VOUT at the output terminal of the secondary-side circuit from dropping too low.

In an optional embodiment, the primary-side controller may be partially woken up to increase the power supply voltage VCC, and the primary-side controller may enter the sleep mode when the power supply voltage VCC rises above a second threshold voltage VCCth2 higher than the first threshold voltage VCCth1. In this way, the power supply voltage can be maintained between the first threshold voltage VCCth1 and the second threshold voltage VCCth2. In another optional embodiment, the sleep mode may be initiated once the power supply voltage VCC rises back to the first threshold voltage VCCth1. This enables the power supply voltage to be maintained around the first threshold voltage VCCth1.

As can be seen from the above description, the control circuit 10 of the present embodiment can enter the sleep mode to minimize the system's standby power dissipation. Moreover, as described in detail below, the control circuit 10 is also able to be quickly woken up from the sleep mode.

In a wake-up method according to an optional embodiment, the secondary-side controller may exit the sleep mode based on a second instruction signal that it has received. Subsequently, the secondary-side controller may provide a corresponding second request signal request_2 to the primary-side controller, which may be then based on the second request signal to carry out necessary operation for exiting the sleep mode.

Specifically, in order to cause the system to exit the sleep mode, the protocol chip may likewise provide the second instruction signal SleepMode that instructs the system to exit the sleep mode and provide it to the secondary-side controller. The secondary-side controller may then acquire a predefined second output signal Forward_2 through detecting the output signal Forward of the secondary-side winding W2 (where the predefined second output signal Forward_2 may be, for example, the output signal of the secondary-side winding W2 output when the primary-side controller is in the partial wake-up mode). At this point, the secondary-side controller may exit the sleep mode and utilize the isolator to produce the second request signal request_2 (where the second request signal may be either a predefined special signal differing from a request signal used in normal operation, or such a request signal used in normal operation). The second request signal request_2 may be sent to the primary-side controller, and the primary-side controller may be further configured to exit the sleep mode upon receiving the second request signal request_2.

Additionally, the primary-side controller may receive the second request signal request_2 when in the partial sleep mode. To this end, the primary-side controller may be partially woken up when detecting that the power supply voltage VCC drops below the first threshold voltage VCCth1, receive the second request signal request_2 while being partially awakened, and completely exit the sleep mode upon receiving the second request signal request_2. For example, when sensing that the primary-side controller has been partially woken up (at this time, the output signal of the secondary-side winding W2 may be configured as the second output signal Forward_2) and receiving the second instruction signal SleepMode, the secondary-side controller may exit the sleep mode, and may couple a signal indicative of exiting the sleep mode to the primary-side controller through the isolator. The primary-side controller may completely exit the sleep mode when it receives the second request signal request_2 while being partially awakened. This enables the system to be quickly woken up. To this end, in practical applications, the period of time in which the primary-side controller is partially woken up may be appropriately extended to ensure that it can receive the second request signal request_2 while being partially awakened.

In an alternative wake-up method according to another optional embodiment, the secondary-side controller may receive the second instruction signal SleepMode that instructs exiting the sleep mode and perform actions necessary for exit from the sleep mode based on the signal to wake up the primary-side controller from the sleep mode.

Specifically, the secondary-side controller may receive the second instruction signal SleepMode that instructs exiting the sleep mode (which may be provided by the protocol chip) and turn on the second switch SR in the secondary-side circuit based on the signal. As a result of the second switch SR being turned on, a change may be caused in the voltage across the secondary-side winding W2. Due to the characteristics of the transformer T1, on the one hand, this will affect the voltage across the primary-side winding W1 and cause a voltage change in the primary-side winding W1. Therefore, the voltage change in the secondary-side winding W2 can be sensed by detecting the voltage change in the primary-side winding W1. Moreover, it will also affect the voltage across the auxiliary winding W3 and cause a voltage change in the primary-side winding W1. Therefore, it is also possible to sense the voltage change in the secondary-side winding W2 by detecting the voltage change in the auxiliary winding W3. Accordingly, the primary-side controller may monitor the voltage across the primary-side winding W1 or the voltage across the auxiliary winding W3. The primary-side controller may exit the sleep mode when the monitored voltage r across the primary-side winding W1 or the voltage across the auxiliary winding W3 reaches a given threshold.

After exiting the sleep mode, the primary-side controller may be also configured to generate a second control signal PWM_2 for turning on or off the first switch G1 in a predefined manner. Based on the second control signal PWM_2, a corresponding switching action may be performed on the first switch G1. For example, the first switch G1 may be turned on once to cause a voltage change in the secondary-side winding W2 of the transformer T1, thus generating a predefined third output signal Forward_3. That is, the third output signal Forward_3 generated by the secondary-side winding W2 may respond to the second control signal PWM_2 for the first switch G1. The secondary-side controller may exit the sleep mode when it senses the third output signal Forward_3.

A control method for causing an isolated switching-mode converter to enter and exit a sleep mode, which is implemented by the control circuit discussed above, will be described in detail below.

As shown in FIG. 1, the isolated switching-mode converter includes a primary-side circuit, a secondary-side circuit and a transformer coupled between the primary-side and secondary-side circuits. The control method includes: sending to the primary-side controller a first request signal request_1 indicative of entering the sleep mode; generating, by the primary-side controller based on the first request signal request_1, a predefined first control signal PWM_1 for turning on or off a first switch G1 in the primary-side circuit in a predefined manner to cause the primary-side controller to enter the sleep mode; turning on or off the first switch G1 based on the first control signal PWM 1 to cause a voltage change in a secondary-side winding W2 of the transformer T1, thereby producing a predefined first output signal Forward_1; and the secondary-side controller entering the sleep mode when sensing the first output signal Forward_1.

In a specific example, after entering the sleep mode, the primary-side controller may still detect a power supply voltage VCC and may enter a partial wake-up mode when the power supply voltage VCC drops below a first threshold voltage VCCth1. In the partial wake-up mode, the first switch G1 may be turned on at least once to increase the power supply voltage VCC to a level not lower than the first threshold voltage VCCth1. For example, the primary-side controller may be partially woken up to increase the power supply voltage VCC, and may be caused to again enter the sleep mode once the power supply voltage VCC rises to the first threshold voltage VCCth1. Alternatively, the primary-side controller may be caused to again enter the sleep mode when the power supply voltage VCC is increased to a second threshold voltage VCCth2 (the second threshold voltage is higher than the first threshold voltage).

In the example of FIG. 1, the isolated switching-mode converter further includes an auxiliary winding W3 and a power supply capacitor Cvcc. The auxiliary winding W3 is coupled to the transformer T1, and one end of the power supply capacitor Cvcc is coupled to the auxiliary winding W3 via a diode. In this case, an undervoltage lockout (UVLO) circuit in the primary-side controller may acquire a voltage across the power supply capacitor Cvcc as the power supply voltage VCC.

Additionally, in order to cause the system to enter the sleep mode, a protocol chip may provide a first instruction signal SleepMode that instructs entering the sleep mode to the secondary-side controller. The secondary-side controller may then utilize an isolator to produce the aforementioned first request signal request_1 from the first instruction signal SleepMode and provide it to the primary-side controller. In addition, after receiving the first instruction signal SleepMode, the secondary-side controller may further keep a second switch SR in the secondary-side circuit in an off state based on the first instruction signal SleepMode, thereby operating the secondary-side circuit in an asynchronous rectification mode.

Optionally, after receiving the first instruction signal SleepMode, the secondary-side controller may further determine, based on output feedback FB, whether to put the system into the sleep mode. For example, actions necessary for entry into the sleep mode may be carried out when a voltage of the output feedback FB is lower than 7 V. Of course, after receiving the first instruction signal SleepMode, the secondary-side controller may directly perform the actions necessary for entry into the sleep mode, without making a determination based on the output feedback FB.

The control method may further include causing the isolated switching-mode converter to exit the sleep mode. In order to cause the system to exit the sleep mode, the protocol chip may likewise provide a second instruction signal SleepMode that instructs exiting the sleep mode.

In an optional embodiment, the protocol chip may provide the second instruction signal SleepMode to the secondary-side controller. After receiving the second instruction signal SleepMode, the secondary-side controller may exit the sleep mode if it detects that an output signal of the secondary-side winding W2 is a predefined second output signal Forward_2 (where the second output signal Forward_2 may be, for example, the output signal of the secondary-side winding W2 output when the primary-side controller is in the partial wake-up mode). Additionally, the secondary-side controller may utilize the isolator to produce a second request signal request_2 from the received second instruction signal SleepMode and provide it to the primary-side controller, the primary-side controller may then exit the sleep mode based on the second request signal request_2.

As noted above, after entering the sleep mode, the primary-side controller may still receive the power supply voltage VCC, and the primary-side controller may be partially woken up when the power supply voltage VCC drops too low. In a specific example, when the primary-side controller receives the second request signal request_2 while being partially awakened, it may determine that it is required to be woken up and may accordingly completely exit the sleep mode.

Instead of exiting the sleep mode based on the received second request signal request_2, as described above, the primary-side controller may alternatively exit the sleep mode based on a change in a signal from the secondary-side winding W2 of the transformer T1, as detailed below.

In an optional embodiment, in order to cause the system to exit the sleep mode, the second instruction signal SleepMode provided by the protocol chip may be provided to the secondary-side controller, which may then turn on the second switch SR in the secondary-side circuit based on the second instruction signal SleepMode to cause a voltage change in the secondary-side winding W2 of the transformer T1. When sensing this voltage change in the secondary-side winding W2, the primary-side controller may determine that it is required to exit the sleep mode.

In practical applications, due the characteristics of the transformer T1, the voltage change in the secondary-side winding W2 of the transformer T1 will cause a corresponding voltage change in each of the primary-side winding W1 and the auxiliary winding W3. Accordingly, the primary-side controller may sense the voltage change in the secondary-side winding W2 by detecting the voltage change in the primary-side winding W1. Alternatively, the primary-side controller may sense the voltage change in the secondary-side winding W2 by detecting the voltage change in the auxiliary winding W3.

Further, after exiting the sleep mode, the primary-side controller may generate a second control signal PWM_2 for turning on or off the first switch G1 in a predefined manner. Based on the second control signal PWM_2, the first switch G1 may be turned on or off to cause a voltage change in the secondary-side winding W2 of the transformer T1, thereby generating a predefined third output signal Forward_3. Furthermore, the secondary-side controller may exit the sleep mode when it senses the third output signal Forward_3.

Figure 2:
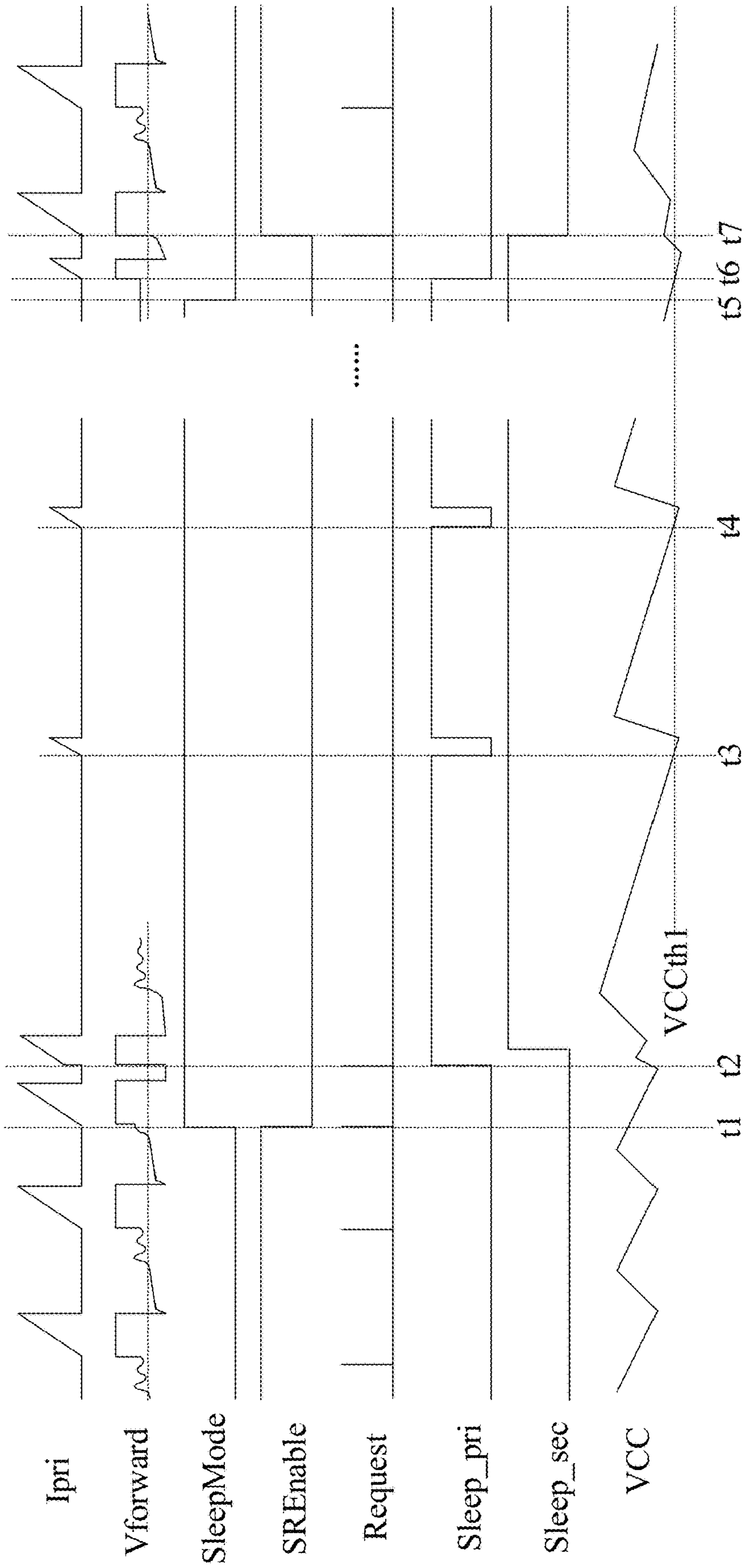
FIG. 2 is a schematic waveform diagram of key signals in an isolated switching-mode converter coupled to a control circuit according to an embodiment of the present invention.

The control method will be described in greater detail below by way of two examples with reference to the waveform diagrams of FIGS. 2 and 3. The following description focuses on entry into and exit from the sleep mode according to the control method.

In a first example, with combined reference to FIGS. 1 and 2, entry into and exit from the sleep mode may involve the steps as follows.

At t1, the protocol chip issues a first instruction signal SleepMode that instructs the system to enter the sleep mode. For example, the first instruction signal SleepMode may be a high-level signal. The signal SleepMode is provided to the secondary-side controller, and the secondary-side controller causes a change, based on the signal SleepMode, in an enable signal SREnable for the second switch SR. Accordingly, the second switch SR is turned off, putting the secondary-side controller into an asynchronous rectification mode.

Further, the isolator produces a corresponding request signal (the first request signal request_1) from the first instruction signal SleepMode and couples it to the primary-side controller. For example, the request signal may be a signal transmitted at a higher frequency, or using a given coding scheme, or with a different pulse width or voltage value.

In t1-t2, the primary-side controller responds to the received first request signal request_1 in a predefined manner. Specifically, the primary-side controller turns on or off the first switch G1. For example, as shown in FIG. 2, the request signal is transmitted at a higher frequency, and the first switch G1 is accordingly turned on at a higher frequency, causing a corresponding change in the output voltage Vforward of the secondary-side winding W2.

At t2, since the first switch G1 is turned on at a higher frequency, the output voltage Vforward of the secondary-side winding W2 again rises to a peak value within a shorter period of time (which is shorter than a period required for demagnetization of the secondary-side winding W2 in normal operation), which is detected by the secondary-side controller. Based on this, it can be determined that the primary-side controller has responded to the first instruction signal SleepMode, and the primary-side controller is caused to enter the sleep mode (e.g., as shown in FIG. 2, a sleep signal Sleep_pri associated with the primary-side controller is inverted). At the same time, the secondary-side controller stops providing the request signal and then enters the sleep mode (e.g., as shown in FIG. 2, a sleep signal Sleep_sec associated with the secondary-side controller is inverted).

At t3, the undervoltage lockout (UVLO) circuit in the primary-side controller detects that the power supply voltage VCC drops below the first threshold voltage VCCth1. In response, the primary-side controller is partially woken up and turns on the first switch G1, allowing the power supply capacitor Cvcc to be charged with a predetermined current to increase the power supply voltage VCC. In FIG. 2, the power supply capacitor Cvcc is charged with a smaller current than that used in normal operation. After that, the sleep signal Sleep_pri may be again inverted when the power supply voltage VCC rises to the first threshold voltage VCCth1 to put the primary-side controller into the sleep mode. Alternatively, the primary-side controller may be again put into the sleep mode when the power supply voltage VCC rises the second threshold voltage VCCth2.

At t4, like the case of t3, it is detected that the power supply voltage VCC drops too low in the sleep mode, and in response to this, the primary-side controller is partially woken up to allow the power supply capacitor Cvcc to be charged to increase the power supply voltage VCC.

At t5, the signal SleepMode from the protocol chip is inverted and becomes a second instruction signal SleepMode that instructs exiting the sleep mode. For example, the second instruction signal SleepMode may be a low-level signal.

At t6, again, it is detected that the power supply voltage VCC drops too low, and the primary-side controller is partially woken up and turns on the first switch G1, allowing the power supply capacitor Cvcc to be charged.

At t7, the secondary-side controller determines that the primary-side controller is being partially awakened from a detected change in the output voltage Vforward of the secondary-side winding W2. At the same time, the signal SleepMode that instructs exiting the sleep mode is active. Accordingly, the secondary-side controller completely exits the sleep mode. Additionally, the secondary-side controller sends a second request signal request_2 to the primary-side controller in a predefined manner, and the primary-side controller exits the sleep mode upon receiving the second request signal request_2.

In this example, the primary-side controller exits the sleep mode when receiving the second request signal request_2 while being partially awakened. Therefore, each time when the primary-side controller is partially woken up, it may be intentionally kept partially awakened for a longer time to ensure that the second request signal request_2 can be received during this period. For example, the primary-side controller may be kept awakened over a period of time from the turn-off of the first switch G1. Alternatively, the primary-side controller may be kept awakened over a period of time from the power supply voltage VCC reaching a predetermined voltage.

Figure 3:
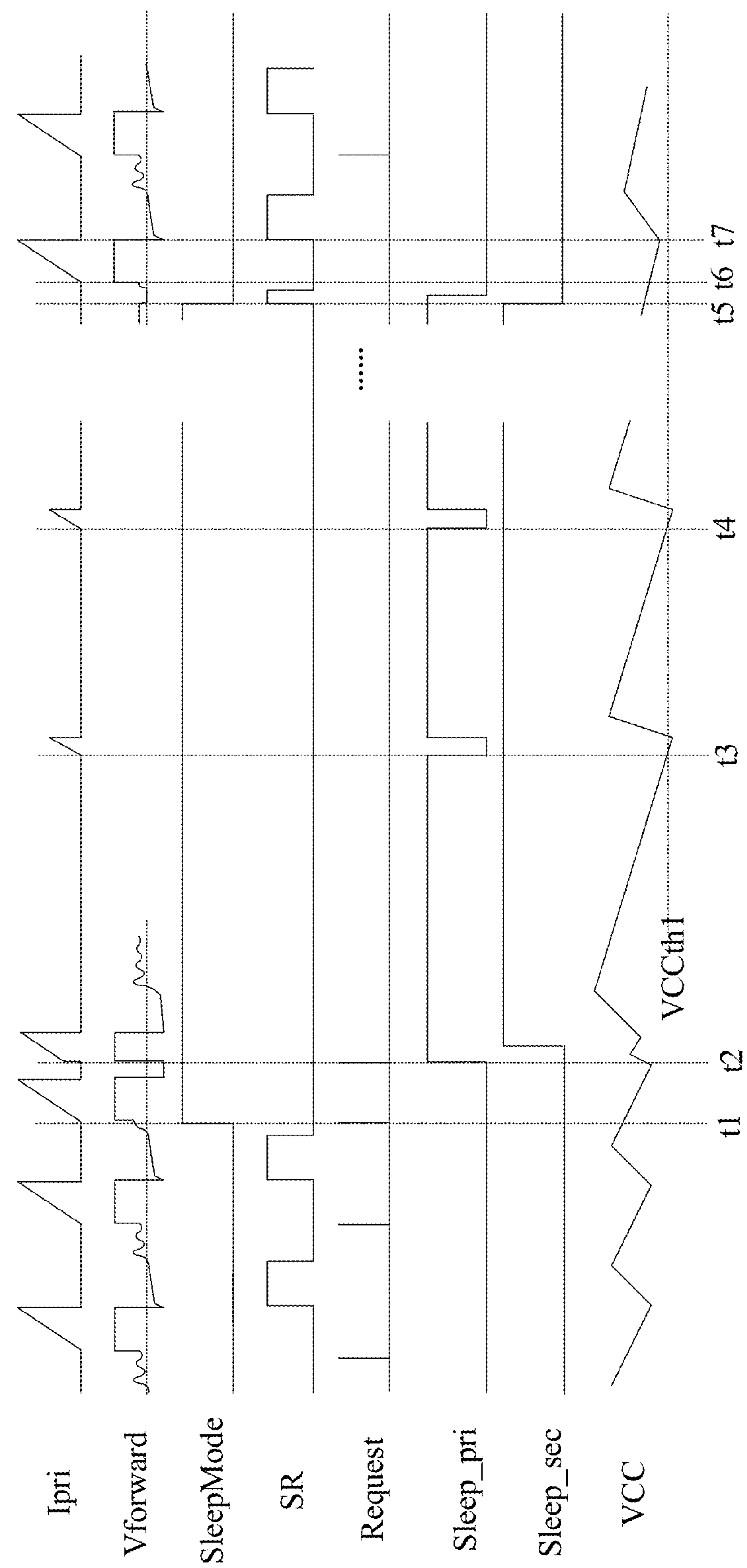
FIG. 3 is a schematic waveform diagram of key signals in the isolated switching-mode converter coupled to the control circuit according to an alternative embodiment of the present invention.

In a second example, with combined reference to FIGS. 1 and 3, the system is caused to enter the sleep mode (corresponding to t1-t4) in the same manner as in the first example, and further description thereof is omitted for the sake of brevity. The following description focuses on exit of the system from the sleep mode in this example.

At t5, the signal SleepMode from the protocol chip is inverted and becomes a signal SleepMode that instructs exiting the sleep mode (i.e., the second instruction signal). In response, the secondary-side controller is partially woken up and produces an enable signal SREnable for the second switch SR, which turns on the second switch SR, causing a change in the output signal Forward of the secondary-side winding W2.

In t5-t6, the primary-side controller detects a voltage change in the primary-side winding W1 or in the auxiliary winding W3, which results from the change in the output signal Forward of the secondary-side winding W2, and then exits the sleep mode.

At t6, after exiting the sleep mode, the primary-side controller again turns on or off the first switch G1 in the predefined manner (e.g., the first switch G1 is turned on once).

At t7, as a result of the first switch G1 being turned on or off, another voltage change is caused in the secondary-side winding W2, thereby generating a predefined third output signal. The secondary-side controller completely exits the sleep mode once detecting the third output signal.

In summary, in the control circuit of the present invention, the primary-side controller can enter a sleep mode, when so requested, and can turn on or off the first switch in the primary-side circuit in a predefined manner to cause the secondary-side winding of the transformer to generate a predefined output signal. The secondary-side controller can detect the predefined output signal and enter the sleep mode based on the signal. When in the sleep state, most modules in the primary-side controller may be powered off to reduce power dissipation. Likewise, when in the sleep state, most modules in the secondary-side controller may be turned off to reduce power dissipation. In this way, overall standby power dissipation of the entire system can be significantly reduced.

Further, in the control circuit of the present invention, a magnetic, capacitive, digital or similar isolator may be used as the isolator arranged between the primary-side and secondary-side controllers. As the isolator almost does not consume power at all when in the sleep mode, overall standby power dissipation of the entire system in the sleep mode can be reduced to an extremely low level.

It is to be noted that the embodiments disclosed herein are described in a progressive manner, with the description of each embodiment focusing on its differences from others. Reference can be made between the embodiments for their identical or similar features. Since the system embodiments correspond to the method embodiments, cross-reference can be made therebetween.

While the invention has been described above with reference to preferred embodiments thereof, it is not limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent alternatives and modifications made to the foregoing embodiments based on the substantive disclosure of the invention without departing from the scope thereof fall within the scope.

It is to be understood that, as used herein, the terms "first", "second", "third" and the like are only meant to distinguish various components, elements, steps, etc. from each other rather than indicate logical or sequential orderings thereof, unless otherwise indicated or specified. Further, it is also to be recognized that, as used herein and in the appended claims, the singular forms "a" and "an" include the plural reference unless the context clearly dictates otherwise. Thus, for example, a reference to "a step" or "a means" is a reference to one or more steps or means and may include sub-steps and sub-means. All conjunctions used are to be understood in the most inclusive sense possible.

The invention claimed is:

1. A control circuit for controlling an isolated switching-mode converter, the isolated switching-mode converter comprising a primary-side circuit, a secondary-side circuit and a transformer coupled between the primary-side circuit and the secondary-side circuit, the control circuit comprising:

a primary-side controller electrically connected to the primary-side circuit, the primary-side controller configured to generate, when receiving a first request signal indicative of a request to enter a sleep mode, a first control signal for turning on or off a first switch in the primary-side circuit in a predefined manner and thereby causing the primary-side controller to enter the sleep mode, wherein the first control signal is predefined;

a secondary-side controller electrically connected to the secondary-side circuit, the secondary-side controller configured to acquire an output signal of a secondary-side winding in the transformer and to enter the sleep mode when the output signal is a predefined first output signal, the first output signal responding to the first control signal; and a protocol chip coupled to the secondary-side controller, the protocol chip configured to provide the secondary-side controller with a second instruction signal which instructs exiting the sleep mode, wherein the secondary-side controller is also configured to receive the second instruction signal that instructs exiting the sleep mode and to turn on a second switch in the secondary-side circuit based on the second instruction signal, and wherein the primary-side controller exits the sleep mode when sensing a change in the secondary-side winding in the transformer, wherein the primary-side controller is also configured to generate, after exiting the sleep mode, a second control signal for turning on or off the first switch in the predefined manner, and wherein the secondary-side controller is configured to acquire the output signal of the secondary-side winding in the transformer and to exit the sleep mode when the output signal is a predefined third output signal, the third output signal responding to the second control signal.

2. The control circuit of claim 1, wherein the primary-side controller comprises a first receiver circuit, a first logic processing circuit and a first driver circuit, the first receiver circuit configured to receive the first request signal and provide the first request signal to the first logic processing circuit, the first logic processing circuit configured to generate a drive signal based on the first request signal and provide the drive signal to the first driver circuit, the first driver circuit configured to generate the first control signal based on the drive signal.

3. The control circuit of claim 1, wherein the primary-side controller is also configured to detect a power supply voltage and enter, when the power supply voltage drops below a first threshold voltage, a partial wake-up mode in which the first switch is turned on at least once to increase the power supply voltage to a level not lower than the first threshold voltage, and wherein the primary-side controller is partially woken up to increase the power supply voltage and again enters the sleep mode when the power supply voltage reaches a second threshold voltage.

4. The control circuit of claim 3, wherein the isolated switching-mode converter further comprises an auxiliary winding and a power supply capacitor, the auxiliary winding coupled to the transformer, one end of the auxiliary winding and one end of the power supply capacitor both connected to a ground terminal for the primary-side circuit, the other end of the power supply capacitor coupled to the other end of the auxiliary winding through a diode, and wherein the primary-side controller comprises an undervoltage lockout circuit, a first logic processing circuit and a first driver circuit, the undervoltage lockout circuit electrically connected to the other end of the power supply capacitor and configured to acquire a voltage across the power supply capacitor as the power supply voltage, the first logic processing circuit configured to generate, when the power supply voltage drops below the first threshold voltage, a drive signal based on an associated comparison and provide the drive signal to the first driver circuit, the first driver circuit configured to generate, based on the drive signal, an ON signal for turning on the first switch to allow the power supply capacitor to be charged to increase the power supply voltage to a level not lower than the first threshold voltage.

5. The control circuit of claim 1, further comprising:

the protocol chip configured to provide the secondary-side controller with a first instruction signal which instructs entering the sleep mode; and an isolator coupled between the primary-side controller and the secondary-side controller, wherein the secondary-side controller receives the first instruction signal, utilizes the isolator to produce the first request signal and provides the first request signal to the primary-side controller.

6. The control circuit of claim 5, wherein the secondary-side controller is also configured to maintain the second switch in the secondary-side circuit in an off state based on the first instruction signal, thereby operating the secondary-side circuit in an asynchronous rectification mode.

7. The control circuit of claim 6, wherein the secondary-side controller comprises a second receiver circuit, a second logic processing circuit and a second driver circuit, the second receiver circuit configured to receive the first instruction signal and provide the first instruction signal to the second logic processing circuit, the second logic processing circuit configured to generate a drive signal based on the first instruction signal and provide the drive signal to the second driver circuit, the second driver circuit configured to generate, based on the drive signal, an OFF signal for maintaining the second switch in the off state.

8. The control circuit of claim 1, wherein the secondary-side controller comprises a detection circuit and a second logic processing circuit, the detection circuit configured to acquire the output signal of the secondary-side winding and provide the output signal to the second logic processing circuit, the second logic processing circuit configured to instruct the secondary-side controller to enter the sleep mode when the output signal is the predefined first output signal.

9. The control circuit of claim 1, wherein the secondary-side controller is configured to acquire the output signal of the secondary-side winding in the transformer and to exit the sleep mode when the output signal is a predefined second output signal and when the secondary-side winding has received the second instruction signal;

the control circuit further comprises an isolator coupled between the primary-side controller and the secondary-side controller; the secondary-side controller is configured to receive the second instruction signal, utilize the isolator to produce a second request signal and provide the second request signal to the primary-side controller; and the primary-side controller is also configured to exit the sleep mode when receiving the second request signal;

wherein the primary-side controller is also configured to receive a power supply voltage and enter, when the power supply voltage drops below a first threshold voltage, a partial wake-up mode in which the first switch is turned on to increase the power supply voltage to a level not lower than the first threshold voltage, and wherein the primary-side controller is woken up when receiving the second request signal while being partially awakened, thus the primary-side controller completely exits the sleep mode.

10. The control circuit of claim 1, wherein the primary-side controller is also configured to enter a partial wake-up mode at a predetermined switching frequency, in which the first switch is turned on at least once to increase a power supply voltage of the primary-side controller; and wherein the isolated switching-mode converter further comprises an auxiliary winding and a power supply capacitor, the auxiliary winding coupled to the transformer, one end of the auxiliary winding and one end of the power supply capacitor both connected to a ground terminal for the primary-side circuit, the other end of the power supply capacitor coupled to the other end of the auxiliary winding through a diode, the power supply capacitor providing the power supply voltage to the primary-side controller.

11. A control method for an isolated switching-mode converter, the isolated switching-mode converter comprising a primary-side circuit, a secondary-side circuit and a transformer coupled between the primary-side circuit and the secondary-side circuit, the control method comprising:

providing a first request signal indicative of a request to enter a sleep mode to a primary-side controller, which then generates, based on the first request signal, a predefined first control signal for turning on or off a first switch in the primary-side circuit in a predefined manner and thereby causing the primary-side controller to enter the sleep mode;

turning on or off the first switch based on the first control signal to cause a change in a secondary-side winding in the transformer, thereby producing a predefined first output signal;

entry of the secondary-side controller into the sleep mode when the secondary-side controller detects the first output signal;

providing a second instruction signal which instructs exiting the sleep mode by a protocol chip to the secondary-side controller;

turning on a second switch in the secondary-side circuit by the secondary-side controller based on the second instruction signal, thereby causing the change in the secondary-side winding in the transformer; and exit of the primary-side controller from the sleep mode when the primary-side controller senses the change in the secondary-side winding in the transformer.

12. The control method of claim 11, wherein after entering the sleep mode, the primary-side controller further detects a power supply voltage and enters, when the power supply voltage drops below a first threshold voltage, a partial wake-up mode in which the first switch is turned on to increase the power supply voltage to a level not lower than the first threshold voltage; and wherein the primary-side controller is partially woken up to increase the power supply voltage and enters the sleep mode again when the power supply voltage reaches a second threshold voltage.

13. The control method of claim 11, wherein the protocol chip provides the secondary-side controller with a first instruction signal which instructs entering the sleep mode, and wherein the secondary-side controller generates, based on the first instruction signal indicating entering the sleep mode, utilizes an isolator to produce the first request signal and provides the first request signal to the primary-side controller.

14. The control method of claim 13, wherein the secondary-side controller maintains, based on the first instruction signal, the second switch in the secondary-side circuit in an off state, thereby operating the secondary-side circuit in an asynchronous rectification mode.

15. The control method of claim 11, further comprising:

detecting, by the secondary-side controller, that an output signal of the secondary-side winding in the transformer is a predefined second output signal, followed by responsive exit of the secondary-side controller from the sleep mode; and by the secondary-side controller, generating a signal indicating exiting the sleep mode based on the second instruction signal and transmitting a second request signal through an isolator to the primary-side controller, which causes the primary-side controller to exit the sleep mode.

16. The control method of claim 15, wherein after entering the sleep mode, the primary-side controller further receives a power supply voltage and enters, when the power supply voltage drops below a first threshold voltage, a partial wake-up mode in which the first switch is turned on to increase the power supply voltage to a level not lower than the first threshold voltage, and wherein the primary-side controller completely exits the sleep mode when receiving the second request signal while being partially awakened.

17. The control method of claim 11, wherein after exiting the sleep mode, the primary-side controller generates a second control signal for turning on or off the first switch in the predefined manner;

the first switch is turned on or off based on the second control signal to cause the change in the secondary-side winding in the transformer, thereby producing a predefined third output signal;

the secondary-side controller acquires an output signal of the secondary-side winding in the transformer and exits the sleep mode when the output signal is the predefined third output signal; and the third output signal responds to the second control signal.

* * * * *